United States Patent [19]

Liao et al.

[11] Patent Number: 5,753,751
[45] Date of Patent: May 19, 1998

[54] PROCESS FOR PREPARING SELF-CURABLE ALKENYL HYDRIDE SILOXANE COPOLYMERS AND COATING COMPOSITION

[75] Inventors: Wen P. Liao, Clifton Park; Susan A. Nye, Feura Bush, both of N.Y.

[73] Assignee: General Electric Company, Waterford, N.Y.

[21] Appl. No.: 736,558

[22] Filed: Oct. 24, 1996

[51] Int. Cl.$^6$ .................................................. C08J 3/24
[52] U.S. Cl. ........................ 524/837; 524/588; 528/15; 528/31; 428/447
[58] Field of Search .................. 528/15, 31; 524/837, 524/588; 428/447

[56] References Cited

U.S. PATENT DOCUMENTS

| | | |
|---|---|---|
| 2,830,967 | 4/1958 | Nitzsche et al. . |
| 3,186,967 | 6/1965 | Nitzsche et al. . |
| 3,839,388 | 10/1974 | Nitzsche et al. . |
| 4,725,643 | 2/1988 | Burkhardt . |
| 4,888,405 | 12/1989 | Gamon et al. . |
| 4,975,510 | 12/1990 | Wegehaupt et al. . |
| 5,008,229 | 4/1991 | Schuster et al. . |
| 5,210,131 | 5/1993 | Gilson et al. . |
| 5,254,621 | 10/1993 | Inoue et al. . |
| 5,258,211 | 11/1993 | Momii et al. . |
| 5,272,225 | 12/1993 | Ogawa et al. . |
| 5,399,402 | 3/1995 | Inoue et al. . |
| 5,403,909 | 4/1995 | Rubinsztajn . |
| 5,420,221 | 5/1995 | Razzano et al. . |
| 5,529,837 | 6/1996 | Fujiki et al. . |

FOREIGN PATENT DOCUMENTS

| | | |
|---|---|---|
| 0 444 960 A2 | 9/1991 | European Pat. Off. . |
| 2 252 969 | 8/1992 | United Kingdom . |

*Primary Examiner*—Melvyn I. Marquis
*Attorney, Agent, or Firm*—Kenneth S. Wheelock

[57] ABSTRACT

A sequential catalysis of the ring opening polymerization of cyclic organosiloxanes using a base catalyst that can be neutralized by a subsequent redistribution and condensation Lewis acid catalyst, preferably a phosphonitrilic compound, permits the rapid synthesis of functionalized and polyfunctionalized silicone copolymers such as alkenyl hydride copolymers, a new composition of matter, which is a one component curable silicone by means of hydrosilylation or peroxide initiated free radical polymerization. The alkenyl hydride copolymer is formulated into a curable composition, emulsified and coated onto an automobile airbag and subsequently cured.

33 Claims, No Drawings

PROCESS FOR PREPARING SELF-CURABLE ALKENYL HYDRIDE SILOXANE COPOLYMERS AND COATING COMPOSITION

FIELD OF THE INVENTION

The present invention relates to a catalyst and process for the preparation of hydrogen siloxane copolymers. The process of the present invention makes possible the synthesis of new compositions of matter, mixed silicone polymers possessing mixed functionalities. These new compositions allow for the manufacture of new articles of manufacture specifically airbag coatings.

BACKGROUND OF THE INVENTION

Most of the coating compositions used for automotive air bags are chloroprene resin blends. These chloroprene resin blends are also used in treating fibrous base materials in the form of woven, knitted and non-woven fabrics of polyamide fibers as by impregnation, coating or lamination. The resulting composite materials have excellent properties inherent to both the polyamide fibers and chloroprene resin and are useful in a variety of applications.

However, these composite materials have some drawbacks. They tend to gradually lose their strength when they are allowed to stand above a certain temperature over a long term because the chloroprene resin releases hydrogen chloride which acts to scission the amide bonds of the polyamide fibers. Since the chloroprene resin is relatively non-elastic, the resin restrains polyamide fibers of the fibrous base material in the composite material to an excessive degree, thereby preventing free motion of the fibers. Thus, the composite materials have a relatively hard feel and low tear strength.

To overcome these drawbacks, it has been proposed to use coating compositions comprising silicone resins which are superior to chloroprene resins with respect to heat resistance, weathering, and flexibility. Typical compositions are blends of a heat vulcanizable silicone resin and a tackifier and blends of an addition-curing type silicone rubber and a tackifier. These silicone coating compositions are applied to base materials of air bags, particularly for automobiles or the like to form coatings thereon which are generally about 40 microns thick. However, to meet a market demand for light weight, compact and low cost products, it is desirable to reduce the coating thickness.

As the coating thickness is reduced, the conventional coating compositions tend to increase in burn rate. When they are applied to automobile air bags, such thin coatings permit the air bags to puncture upon explosive expansion of an inflator. As a result, the air bags lose gas tightness and are thus impractical because they fail to function for their intended purpose.

Polydimethylsiloxane fluids may be conveniently prepared by any of several synthetic methods. A common and widely used industrial process to prepare such fluids involves the hydrolysis of halo-functional silanes followed by condensation. A second process begins with cyclic organosiloxanes utilizing a ring-opening polymerization to produce either a kinetically or equilibrium controlled mixture of linear and cyclic organosiloxane compounds.

Ring-opening polymerization of cyclic organosiloxanes has generally been by either acid or base catalysis. The catalysts that have been successfully employed range from very acidic catalysts such as trifluoromethane sulfonic acid to very basic such as potassium hydroxide or potassium silanolate. A wide variety of acid catalysts have been employed to catalyze ring opening polymerization, sulfuric acid, acid washed clays, acidic ion exchange resins and linear phosphonitrilic chlorides (LPNC).

While ring opening polymerization may be accomplished with either an acidic or basic catalyst, the preparative chemistry of hydrogen containing siloxanes (i.e. silyl hydrides) is restricted to the acidic catalysts. When a basic catalyst is used, the ring opening polymerization proceeds, but base catalyzed hydride abstraction produces hydroxy functionalities in place of the hydrogen functionalities and the material condenses through the silanol groups. The hydride functionality thus does not survive basic reaction conditions. While this produces a polymer, it produces a cross-linked polymer in contrast to a linear polymer.

Process considerations in the choice of an acidic catalyst for the preparation of hydrogen organosiloxanes tend to require the milder acid catalysts in contrast to sulfuric acid and trifluoromethane sulfonic acid because these acids are very strong and highly corrosive. The use of such strong acids requires the use of special alloys in process vessels to avoid acid induced corrosion and contamination of the resulting product.

Milder acid catalysts such as the acid washed clays and acidic ion exchange resins possess drawbacks that while avoiding the corrosion and contamination problems associated with strong acid attack on metal process vessels, cause other problems. The acidic ion exchange resins do not maintain catalytic activity well for any significant and economically useful period of time, requiring frequent regeneration or refreshment. Acid washed clays are generally used as powders to improve contacting efficiency between the reaction substrate and the catalyst which necessitates a downstream filtration to remove the acid washed clay catalyst fines from the product. Further, acid washed clays generally contain residual amounts of water that contributes to a hydride silanol interchange that results in a gradual and undesired condensation polymerization of the hydride product. By comparison to the stronger acid catalysts, these milder acid catalysts suffer from lower reaction rates and thus a lower production of product per unit time at any given temperature.

While the kinetic rate deficiencies of any given catalyst may be offset by an increase in temperature, this solution has at least two serious drawbacks. The first is that as temperature is changed, i.e. increased, the relative proportions of reactants, desired products and undesired by-products change. This change may either benefit the desired process or be a detriment depending on the relative amounts of the desired product as a function of the increased temperature because the equilibrium constant for the reaction is a function of temperature. As the temperature is increased, the amount of energy furnished the reaction to increase the temperature must be increased (for endothermic reactions) and this almost always adversely affects the process economics. There is thus a complex balancing between the desired reaction rate, the desired product mix, catalyst activity and process operating variables.

In contrast to the acid catalysts that must either be neutralized, e.g. sulfuric acid, or separated from the product, e.g. acid washed clays, phosphonitrilic halides, particularly linear phosphonitrilic chlorides (LPNC), have found particular use for the redistribution and condensation of organosiloxane oligomers. These LPNC catalysts may be used at fairly low levels in the reaction being catalyzed, e.g.

between 25 and 2,000 ppm. An additional advantage is that the catalyst may be left in the product and thermally deactivated if desired. This procedure usually does not result in any significant contamination of the product.

While the LPNC catalysts have been particularly useful for redistribution and condensation reactions involving silicones and siloxanes, they have not usually been used for ring opening polymerization because of the low rates associated with these catalysts in reactions of this type. While it is possible to achieve acceptable reaction rates in the synthesis of hydride siloxane organosiloxane copolymers when the hydride level is above approximately 1,000 ppm, the rate of ring opening polymerization in the presence of a low hydride level siloxane (~300 ppm) is extremely slow requiring a matter of days as opposed to hours. Thus LPNC materials would not be expected to be particularly well suited to catalyze ring opening polymerization in the presence of low hydride content siloxanes to make low hydride content siloxane polymers.

SUMMARY OF THE INVENTION

The invention comprises a curable silicone composition comprising:

a) a silicone hydride copolymer having the formula:

$$M_u D_q T_r Q_s$$

having at least two $D_q$ where each $D_q$ is different from every other $D_q$ and each $D_q$ has the formula:

$$D_q = SiR^1R^2O_{2/2}$$

where each $R^1$ and $R^2$ in each $D_q$ is independently selected from the group consisting of hydrogen and one to forty carbon atom monovalent hydrocarbon radicals where each subscript q of $D_q$ is independently one or greater with $$M = R^4R^5R^6SiO_{1/2}$$

where $R^4$, $R^5$ and $R^6$ are each independently selected from the group consisting of hydrogen and one to forty carbon atom monovalent hydrocarbon radicals where the stoichiometric subscript u of M is non-zero and positive;

$$T = R^7SiO_{3/2}$$

where $R^7$ is selected from the group consisting of hydrogen and one to forty carbon atom monovalent hydrocarbon radicals with the stoichiometric subscript r of T zero or positive; and $$Q = SiO_{4/2}$$

with the stoichiometric subscript s of Q is zero or positive; subject to the limitation that one of $R^1$, $R^2$, $R^4$, $R^5$, $R^6$, and $R^7$ is hydrogen and that one of $R^1$, $R^2$, $R^4$, $R^5$, $R^6$, and $R^7$ which is not hydrogen is an alkenyl group having from two to forty carbon atoms wherein said silicone hydride copolymer comprises an alkenyl group; and b) a catalyst.

The invention further provides for a curable emulsion comprising:

a) a silicone hydride copolymer having the formula:

$$M_u D_q T_r Q_s$$

having at least two $D_q$ where each $D_q$ is different from every other $D_q$ and each $D_q$ has the formula:

$$D_q = SiR^1R^2O_{2/2}$$

where each $R^1$ and $R^2$ in each $D_q$ is independently selected from the group consisting of hydrogen and one to forty carbon atom monovalent hydrocarbon radicals where each subscript q of $D_q$ is independently one or greater with $$M = R^4R^5R^6SiO_{1/2}$$

where $R^4$, $R^5$ and $R^6$ are each independently selected from the group consisting of hydrogen and one to forty carbon atom monovalent hydrocarbon radicals where the stoichiometric subscript u of M is non-zero and positive;

$$T = R^7SiO_{3/2}$$

where $R^7$ is selected from the group consisting of hydrogen and one to forty carbon atom monovalent hydrocarbon radicals with the stoichiometric subscript r of T zero or positive; and $$Q = SiO_{4/2}$$

with the stoichiometric subscript s of Q is zero or positive; subject to the limitation that one of $R^1$, $R^2$, $R^4$, $R^5$, $R^6$, and $R^7$ is hydrogen and that one of $R^1$, $R^2$, $R^4$, $R^5$, $R^6$, and $R^7$ which is not hydrogen is an alkenyl group having from two to forty carbon atoms wherein said silicone hydride copolymer comprises an alkenyl group;

b) a catalyst;

c) an emulsifying agent; and d) water.

As a consequence of these two new compositions, the invention further provides for articles of manufacture comprising both the curable compositions and the curable emulsions of the present invention. Since these curable compositions and emulsions may be used as coatings the invention further provides for laminates made with these new compositions and emulsions.

DETAILED DESCRIPTION OF THE INVENTION

We now disclose that silanolate catalysts may be used for an initial ring opening polymerization reaction of cyclic organosiloxanes followed by the introduction of phosphonitrilic halide catalyst and hydrogen containing organosiloxane for the subsequent redistribution and condensation reaction to produce a hydrogen containing organosiloxane copolymer conducted in the same reaction vessel.

Thus the process of the present invention comprises the following steps:

1) $D_x \longrightarrow$ HOSiR$^1$R$^2$(D$_q$)SiR$^1$R$^2$OH base catalyst where $D = SiR^1R^2O_{2/2}$ with $R^1$ and $R^2$ independently selected from one to forty carbon atom monovalent hydrocarbon radicals and q>x, with x generally ranging as follows $3 \leq x \leq 8$. The base catalyst may be any generally known in the art to polymerize cyclic organosiloxanes, however, the catalyst must be capable of neutralization by an acidic species, either Arrhenius acid, Bronsted acid or Lewis acid. The preferred acidic neutralization agent is a Lewis acid selected from the group of phoshonitrilic halides. Catalysts such as an alkali metal silanolate, an alkali metal hydroxide, and tetra-organo-substituted ammonium hydroxide such as tetramethyl ammonium hydroxide and the like are preferred.

2) Base catalyst (from reaction 1)) + Lewis acid catalyst ⟶ neutralization complex,

3) $MD^H_pM + HOSiR^1R^2(D_q)SiR^1R^2OH \xrightarrow{\text{Lewis acid catalyst}} MD^H_pD_qM$ where $D^H=SiR^3HO_{2/2}$ where $R^3$ is selected from one to forty carbon atom monovalent hydrocarbon radicals (alternatively $D^H=SiR^1R^2O_{2/2}$ with $R^1$ and $R^2$ selected from the group of hydrogen and one to forty carbon atom monovalent hydrocarbon radicals where one of $R^1$ and $R^2$ is hydrogen) and where $M=R^4R^5R^6SiO_{1/2}$ where $R^4$, $R^5$ and $R^6$ are each independently selected from the group consisting of hydrogen and one to forty carbon atom monovalent hydrocarbon radicals where the subscripts p and q are positive integers independently ranging from about 1 to about 1,000, preferably from about 1 to about 700, more preferably from about 1 to about 500, and most preferably from about from about 1 to about 400. It is to be noted that the process of the present invention is most advantageous when it is desired to make copolymers having fairly low levels of hydride present, i.e. when the stoichiometric subscript q in the copolymer is very much larger than the stoichiometric subscript p.

The Lewis acid catalyst for reaction 3) is selected from the group of phosphonitrilic halide catalysts as disclosed and taught in U.S. Pat. No. 5,420,221; as well as those and including but not limited to:

$(X_3P(NPX_2)_nPX_3)^+PX_6^-$ where n is an integer of from 1 to 6 and X is a halide selected from the group consisting of F, Cl, Br, and I;

$(X_3P(NPX_2)_nNPX_3)^+PX_6^-$ where n is an integer of from 1 to 6 and X is a halide selected from the group consisting of F, Cl, Br, and I;

$(X_3P(NPX_2)_nNPX_3)^+EX_m^-$ where E is an element having an electronegativity value of from 1.2 to 2 such as Al, Sb, P, Sn, Zn and Fe with m an integer of from 3 to 8;

$O(X)_{2-a}Y_aP(NPX_2)_bNPX_{3-c}Y_c$ where b is an integer ranging from 0 to 8, a is 0 or 1, c is 0 or 1 Y is selected from the group consisting of OH, OR' and R'CO$_2$ where R' is alkyl or aryl;

$O(X)_{2-a}Y_aP(NPX_2)_bNP(O)X_{2-c}Y_c$ where b is an integer ranging from 0 to 8, a is 0 or 1, c is 0 or 1, X is a halogen selected from the group consisting of fluorine, chlorine, bromine, and iodine, Y is selected from the group consisting of OH, OR' and R'CO$_2$ where R' is alkyl or aryl;

$X_{3-p}(HO)_pP(NPX_2)_mNP(O)X_2$, where X is a halogen selected from the group consisting of F, Cl, Br, and I, and m is an integer ranging from 0 to 6 and p is 0 or 1; and $X_3P(NPX_2)_mNPX_2(O)$ where m values can vary from 0 to 6.

It is preferred that the initial ring opening polymerization be conducted in the presence of an M rich chain terminating source. Thus while it is preferred to utilize short chain low molecular weight M rich compounds to control the equilibrium distribution of polymer, the use of M rich compounds of greater structural complexity such as those incorporating T or Q branching points thus produces branched polymers. The reaction of the product polymer, either as the linear or branched polymer, with the hydride of reaction 3) produces a copolymer that is likewise linear or branched. The molar ratio of M rich siloxane compound to cyclic siloxane compound governs the equilibrium distribution of the resulting polymeric siloxane.

While it is desirable to utilize highly M rich chain terminating compounds in reaction 1), the nature of the substituents on the M unit may be varied to impart additional functionality to the product of reaction 3). For example, one of the R groups on the M group may contain olefinic unsaturation. Thus a copolymer that is simultaneously an hydride and an alkenyl organosiloxane may be prepared by reacting an M-rich compound containing an alkenyl substitution in the initial ring-opening polymerization to produce an alkenyl stopped intermediate that is then condensed and redistributed to produce the di-functional compound $$M^{vi}D^H_pD_qM^{vi}$$

where $M^{vi}=M$ where one or more of $R^4$, $R^5$ and $R^6$ is a monovalent alkenyl radical.

Alternatively, the M-rich compound used as a chain-stopping agent in the initial ring-opening polymerization may be fairly conventional, such as a trimethyl stopped compound, but the cyclic compound is functionalized, e.g. a tetramer where one of the R groups on each D unit is a monovalent alkenyl radical, e.g. $D^{vi}$, an idiosyncratic symbol for an alkenyl containing D group, where the superscript vi indicates that one or more of $R^1$ and $R^2$ is a monovalent alkenyl radical. Similarly the superscript Ph indicates that one or more of $R^1$ and $R^2$ is a phenyl or other aromatic radical. Because of the unique selectivity of this reaction sequence, the cyclic compounds which are the starting materials may also be functionalized. Thus if one of the R groups on the D units comprising the cyclic organosiloxanes is an alkenyl group, an alkenyl on chain, hydride on chain copolymer may be prepared, e.g. $M^{vi}D^H_pD^{vi}_qM^{vi}$.

Instead of utilizing a single cyclic species for the ring-opening polymerization, mixtures of cyclic species may be employed and each cyclic species may be differently functionalized to prepare complex copolymers that are then reacted to form complex hydride copolymers. Such materials have the general formula:

$$MD^H_pD^1_{q1}D^2_{q2}\ldots D^n_{qn}T_rQ_sM_u$$

where $D^H_p \neq D^1_{q1} \neq D^2_{q2} \neq \ldots \neq D^n_{qn}$, i.e. none of the various D's are alike, and the subscripts q1 through qn, for all n different D groups, satisfy the definition for the subscript q as previously defined and the subscripts r, s, and u in the units $T_r$, $Q_s$, $M_u$ which are tri-functional, tetrafunctional or monofunctional units range over the same values as p or q.

Thus the difunctional compound $$M^{vi}D^H_pD_qM^{vi}$$

where $M^{vi}=M$ where one or more of $R^4$, $R^5$ and $R^6$ is an alkenyl group is a member of this series; the difunctional compound $$MD^H_pD^{vi}_qM$$

where $D^{vi}=D$ where $R^1$ or $R^2$ is an alkenyl group is a member of this series; the trifunctional compound:

$$M^{vi}D^H_pD^{vi}_qM^{vi}$$

is a member of this series. By a ring opening polymerization of two cyclic species, e.g. $D_{q1}$ and D, a copolymer results from the first stage reaction. By a ring opening polymerization of more than two cyclic species, e.g. $D^1_{q1}$, $D^2_{q2}$, ... $D^n_{qn}$ and D, a higher order polymer results from the first stage reaction. The precursors containing the different D groups, $D^1_{q1} \neq D^2_{q2} \neq \ldots \neq D^n_{qn}$, may be differently functionalized leading to a multi-functionalized first stage product. Further, choice of a functionalized or non-functionalized M rich compound leads to an initial product that is non-functionalized or functionalized at the terminal positions of the molecule as the case may be. The second stage reactant may be differently functionalized from the first stage product so that di, tri-, tetra- functionalized copolymers or terpolymers and the like may result from the second stage reaction.

Thus the process of the present invention enables the production of the following new compositions of matter:

$M^{vi}D^H_p D_q M^{vi}$, the T, Q and TQ variants $M^{vi}D^H_p D_q T_r M^{vi}$, $M^{vi}D^H_p D_q Q_s M^{vi}$, and $M^{vi}D^H_p D_q T_r Q_s M^{vi}$;

$MD^H_p D^{vi}_q M$, the T, Q and TQ variants $MD^H_p D^{vi}_q T_r M$, $MD^H_p D^{vi}_q Q_s M$, and $MD^H_p D^{vi}_q T_r Q_s M$;

$M^{vi}D^H_p D^{vi}_q M^{vi}$, the T, Q and TQ variants $M^{vi}D^H_p D^{vi}_q T_r M^{vi}$, $M^{vi}D^H_p D^{vi}_q Q_s M^{vi}$, and $M^{vi}D^H_p D^{vi}_q T_r Q_s M^{vi}$;

$M^{vi}D^H_p D'_{q1} D_{q2} M^{vi}$, the T, Q and TQ variants $M^{vi}D^H_p D'_{q1} D_{q2} T_r M^{vi}$, $M^{vi}D^H_p D'_{q1} D_{q2} Q_s M^{vi}$, and $M^{vi}D^H_p D'_{q1} D_{q2} T_r Q_s M^{vi}$;

$MD^H_p D^{vi}_{q1} D_{q2} M$, the T, Q and TQ variants $MD^H_p D^{vi}_{q1} D_{q2} T_r M$, $MD^H_p D^{vi}_{q1} D_{q2} Q_s M$, and $MD^H_p D^{vi}_{q1} D_{q2} T_r Q_s M$;

$M^{vi}D^H_p D^{vi}_{q1} D_{q2} M^{vi}$, the T, Q and TQ variants $M^{vi}D^H_p D^{vi}_{q1} D_{q2} T_r M^{vi}$, $M^{vi}D^H_p D^{vi}_{q1} D_{q2} Q_s M^{vi}$, and $M^{vi}D^H_p D^{vi}_{q1} D_{q2} T_r Q_s M^{vi}$; the higher order polymers based on $D^1_{q1} \neq D^2_{q2} \neq \ldots D^n_{qn}$ and the T, Q and TQ variants thereof, and the like, including the $M^H$ variants.

The curable compositions of the present invention comprise:

(a) an alkenyl hydride having the formula:

$$M_u D_q T_r Q_s,$$

having at least two $D_q$ where each $D_q$ is different from every other $D_q$ and each $D_q$ has the formula:

$$D_q = SiR^1 R^2 O_{2/2}$$

where each $R^1$ and $R^2$ in each $D_q$ is independently selected from the group consisting of hydrogen and one to forty carbon atom monovalent hydrocarbon radicals where each subscript q of $D_q$ is independently one or greater with $$M = R^4 R^5 R^6 SiO_{1/2}$$

where $R^4$, $R^5$ and $R^6$ are each independently selected from the group consisting of hydrogen and one to forty carbon atom monovalent hydrocarbon radicals where the stoichiometric subscript u of M is non-zero and positive;

$$T = R^7 SiO_{3/2}$$

where $R^7$ is selected from the group consisting of hydrogen and one to forty carbon atom monovalent hydrocarbon radicals with the stoichiometric subscript r of T zero or positive; and $$Q = SiO_{4/2}$$

with the stoichiometric subscript s of Q is zero or positive; subject to the limitation that one of $R^1$, $R^2$, $R^4$, $R^5$, $R^6$, and $R^7$ is hydrogen and that one of $R^1$, $R^2$, $R^4$, $R^5$, $R^6$, and $R^7$ which is not hydrogen is an alkenyl group having from two to forty carbon atoms; and (b) a hydrosilylation catalyst.

The curable emulsions of the present invention comprise the curable silicone composition of the present invention in an emulsion form, comprising:

(a) an alkenyl hydride having the formula:

$$M_u D_q T_r Q_s,$$

$$M_u D_q T_r Q_s,$$

having at least two $D_q$ where each $D_q$ is different from every other $D_q$ and each $D_q$ has the formula:

$$D_q = SiR^1 R^2 O_{2/2}$$

where each $R^1$ and $R^2$ in each $D_q$ is independently selected from the group consisting of hydrogen and one to forty carbon atom monovalent hydrocarbon radicals where each subscript q of $D_q$ is independently one or greater with $$M = R^4 R^5 R^6 SiO_{1/2}$$

where $R^4$, $R^5$ and $R^6$ are each independently selected from the group consisting of hydrogen and one to forty carbon atom monovalent hydrocarbon radicals where the stoichiometric subscript u of M is non-zero and positive;

$$T = R^7 SiO_{3/2}$$

where $R^7$ is selected from the group consisting of hydrogen and one to forty carbon atom monovalent hydrocarbon radicals with the stoichiometric subscript r of T zero or positive; and $$Q = SiO_{4/2}$$

with the stoichiometric subscript s of Q is zero or positive; subject to the limitation that one of $R^1$, $R^2$, $R^4$, $R^5$, $R^6$, and $R^7$ is hydrogen and that one of $R^1$, $R^2$, $R^4$, $R^5$, $R^6$, and $R^7$ which is not hydrogen is an alkenyl group having from two to forty carbon atoms; and (b) a hydrosilylation catalyst;

(c) an emulsifier; and (d) water.

As a curable silicone composition, component (a), the alkenyl hydride ($M_u D_q T_r Q_s$), ranges from about 1 to about 99.99 weight percent, preferably from about 10 to about 99.99 weight percent, more preferably from about 20 to about 99.99 weight percent, and most preferably from about 30 to about 99.99 weight percent of the total composition; component (b), the catalyst, ranges from about 0.01 to about 5 weight percent; preferably from about 0.01 to about 3 weight percent; more preferably from about 0.01 to about 1.5 weight percent, and most preferably from about 0.01 to about 0.75 weight percent. Component (b) is a catalyst for the curing of the alkenyl hydride. Since the alkenyl hydride contains both olefinic unsaturation and active hydrogen functionalities the catalyst that may be employed is a hydrosilylation catalyst, typically a hydrosilylation catalyst comprising a noble metal. Also, because the alkenyl hydride contains olefinic unsaturation, the olefin moieties may be polymerized by the addition of a free radical initiator, typically organic peroxides including but not limited to peroxy carboxylic acids and their derivatives. Combination catalysis, such as combining hydrosilylation catalysts with free radical catalyst may also be employed depending on the circumstances of use.

When component (a) and component (b) do not sum to 100.00 weight percent, additional optional ingredients have been added. For example either extending or reinforcing fillers may be added; such filler materials including but not limited to fumed silica, precipitated silica, ground quartz, carbon black, carbon fibers, carbon fibriles, graphite, calcium carbonate, alumina, silica, silazane, treated silica, silica aerogel, high surface area forms of crystalline and non-crystalline silica-aluminas, titania, magnesia, iron oxide, diatomaceous earth, chromic oxide, zirconium oxide, zirconium silicate, calcined clay and the like.

Both the resin composition and the emulsion composition comprise the self-curing alkenyl hydride and a hydrosilylation catalyst. Thus it may also be advantageous to employ hydrosilylation catalyst inhibitors. U.S. Pat. Nos. 3,445,420; 4,256,870; and 5,506,289, herein and herewith incorporated by reference teach to compositions suitable for use as inhibitors with noble catalyzed hydrosilylation catalysts.

The compositions of the present invention may additionally comprise other materials added to improve the properties of either the curable formulation or the properties of the cured formulation. Such additional materials include for example stabilizers . . .

When used as an emulsion, the emulsion comprises:

(1) from about 0.1 to about 99, preferably from about 1 to about 95, more preferably from about 25 to about 90, and most preferably from about 50 to about 80 weight percent of alkenyl hydride ($M_uD_qT_rQ_z$);

(2) from about 0.0000001 to about 10, preferably from about 0.0000005 to about 5, more preferably from about 0.000001 to about 1, and most preferably from about 0.0000005 to about 0.5 weight percent of a hydrosilylation catalyst;

(3) from about 0.001 to about 50, preferably from about 0.01 to about 20, more preferably from about 0.1 to about 10, and most preferably from about 1 to about 5 weight percent of an emulsifier; and (4) from about 1 to about 99, preferably from about 10 to about 95, more preferably from about 20 to about 90, and most preferably from about 40 to about 80 weight percent of water.

The emulsifying agents utilized in preparing the curable emulsions of the present invention may be any known in the art to emulsify silicones provided that: 1) the emulsifying agent does not interfere with the curing of the alkenyl hydride; 2) the emulsifying agent does not deactivate the hydrosilylation catalyst; and 3) the emulsifying agent does not participate in any unwanted chemical reaction.

An emulsion is prepared by mixing the alkenyl hydrides of the invention along with any other silicones that may be admixed with surfactants, followed by slow addition of water. A mill that creates a high shear may be used to invert the mixture into an oil-in-water emulsion. The emulsion can be cured by the addition of a platinum catalyst. The emulsifying agent is selected from the group consisting of anionic, nonionic, and cationic emulsifying agents. Anionic emulsifying agents are preferably selected from the group consisting of alkyl, aryl, and alkylaryl sulfonic acids, where the alkyl groups are 1 to 20 carbon atom alkyl groups and the aryl groups are 6 to 30 atom aryl groups. Nonionic emulsifying agents are preferably selected from the group consisting of $C_{11}$–$C_{15}$ secondary alcohol ethoxylate, ethoxylated nonylphenol, polyglycerin fatty acid esters, polyoxyethylene sorbitan fatty acid esters, polyoxyethylene castor oils, polyoxyethylene secondary alkyl ethers where the alkyl group ranges from 6 to 40 carbon atoms, polyoxyethylene alkyl ethers where the alkyl group ranges from 6 to 40 carbon atoms, polyoxyethylene alkyl amines where the alkyl group is independently selected and ranges from 6 to 40 carbon atoms, polyoxyethylene alkyl amides where the alkyl group is independently selected and ranges from 6 to 40 carbon atoms, polyoxyethylene lanolins, POE(4) lauryl ether, POE(9) lauryl ether, POE(23) lauryl ether, POE(20) stearyl ether, POE(20) sorbitan mono-palmitate, amphoteric betaine surfactants, lauryldimethylaminoacetic acid betaine, coco fatty amide propyldimethylaminoacetic acid betaine, 2-alkyl-N-carboxymethyl-N-hydroxyethylimidazolinium betaine, sodium N-lauroyl sarcosine, and lanolin derivatives of quaternary ammonium salts. Cationic emulsifying agents are preferably selected from the group consisting of monomethyl ethoxylated quaternary ammonium halides, monomethyl ethoxylated ammonium sulfate, alkyl trimethyl ammonium halides, and alkyl trimethyl sulfate where the alkyl group of said cationic surfactant ranges from about 9 to about 30 carbon atoms. A preferred group of emulsifying agents are the non-ionic emulsifying agents, preferably those nonionic emulsifying agents having a hydrophilic to lipophilic balance ratio ranging from about 6 to about 17, more preferably ranging from about 7 to about 16 and most preferably ranging from about 8 to about 15. Particularly preferred emulsifying agents are $C_{11}$–$C_{15}$ secondary alcohol ethoxylate and ethoxylated nonylphenol. These emulsifying agents may be used either singly or in combination. The various emulsifying agents that may be employed in producing the emulsions of the present composition are not strictly limited to the preferred emulsifying agents listed since almost any emulsifying agent may be employed provided it meets the functional criteria set forth.

The curable compositions and the curable emulsions as described are primarily employed in coating substrates. As coating agents, such compositions can benefit from the incorporation of adhesion promoters. In the present silicone coating composition, an adhesion promoter, reaction inhibitor and other additives may be blended in addition to the above-mentioned components. Other types of organopolysiloxane may be further blended. Such additives which can be additionally blended include adhesion promoters, which are typically an organosilane compound (often referred to as a silane coupling agent) having two or three alkoxy groups and a functional group (e.g. alkenyl group, acryloxy group, methacryloxy group, glycidoxy group, etc.), such as vinyltrimethoxysilane, 3-methacryloxypropyltrimethoxysilane, 3-acryloxypropyltrimethoxy-silane, γ-glycydoxypropyltrimethoxysilane and 3-glycidoxypropyltrimethoxysilane, reaction inhibitors such as methylvinylcyclo-polysiloxane, acetylene alcohols, and triallylisocyanurate or as taught in U.S. Pat. Nos. 3,445,420; 4,256,870; and 5,506,289, plasticizers such as non-functional dimethylpolysiloxane, and viscosity modifiers. Also, silicones consisting of MD, MDQ, MTQ, or MDTQ, where the M, D, T and Q units are as previously defined subject to the limitation that the silicone is miscible with the alkenyl hydride, may be used as a mechanical strength enhancer. These additives may be added in any desired amount.

Additional components may be added to the compositions of the present invention to impart improved properties to the curable composition (alkenyl hydride and catalyst) or to the curable emulsion (alkenyl hydride, catalyst, emulsifier and water). For example, if desired, benzotriazole and/or benzimidazole may be added as an additional component in the alkenyl hydride comprising composition. It is effective for further improving the high-temperature resistance of a silicone coated base material. It is added in an amount of up to 1 part, normally 0.01 to 1 part, preferably of 0.05 to 0.5 part by weight per 100 parts by weight of alkenyl hydride. Such minor amounts of the compound are fully effective for improving high-temperature resistance. Much more than 1 part by weight of benzotriazole and/or benz-imidazole may retard curing of the silicone coating composition. However, this can generally be compensated for by addition of extra catalyst or by increasing the curing temperature to compensate for the retardation of the curing process. Addition of benzotriazole and/or benz-imidazole ensures further improved high-temperature resistance.

The curable compositions and the curable emulsions using the curable compositions of the present invention may be coated onto substrates and subsequently cured. Coating onto a substrate thus prepares a laminate. The substrates may be either rigid or flexible. Thus rigid substrates comprise but are not limited to glass, thermoplastic sheet derived from organic homopolymers and copolymers, metals such as steel, copper and the like, wood, masonry and the like. Flexible substrates include but are not limited to fabrics, flexible films, foils, and the like. The curable compositions and curable emulsions using theses compositions may be cast into films and used as separation media.

The curable compositions of the present invention may be used in a solventless system, an aqueous emulsion system or a system diluted with a compatible organic solvent. In any case, the composition is usually adjusted to a viscosity of 1 to 50,000 centipoise, preferably 10 to 30,000 centipoise at 25° C. before it is applied to a base material (or substrates). When applied to a flexible substrate, the substrate is selected from the group consisting of cotton, wool, silk, polyamide fibers, polyester fibers, cellulose fibers, woven and nonwoven fabrics thereof, films or sheets of thermoplastic polymers and homopolymers, and the like. A coating is formed to a dry thickness of about 5 to 20 microns. For the application purpose, coating, impregnation and spraying techniques are used. If the viscosity of the composition exceeds 50,000 centipoise at 25° C., it is difficult to form a uniform coating of 5 to 20 microns thick. After application, the coating is generally cured by heating at 60° to 180° C. for 1/10 to 10 minutes. In this way, there is obtained a silicone coated base material (or substrates) which are entirely or partially covered with a coating of the silicone coating composition to a thickness of 5 to 20 microns.

All United States patents referenced herein are herewith and hereby incorporated by reference.

DEFINITIONS

It is explicitly noted that where exemplary reactions recite generic reactants that mixtures of species of reactants satisfying the genus definition may be substituted therefore.

Applicants define M rich silicone compounds to be those silicones where the ratio of M groups to the sum of D, T, and Q groups present in the molecule is 0.04 or greater. That is by way of explanation given a silicone of the general formula $M_iD_jT_kQ_h$, the subscripts j, k, and h are integers that are zero or positive and i is a positive non-zero integer, an M rich silicone is defined as one where the subscripts satisfy the criterion $(i/(j+k+h)) \geq 0.04$, preferably this ratio is 0.10 or greater, more preferably this ratio is 0.15 or greater, and most preferably this ratio is 0.20 or greater. M, D, T and Q have the usual definitions of structural silicone chemistry, that is M is a monofunctional chain terminating organosiloxyl group i.e. $M=R^4R^5R^6SiO_{1/2}$ where $R^4$, $R^5$ and $R^6$ are each independently selected from the group consisting of hydrogen and one to forty carbon atom monovalent hydrocarbon radicals, D is a difunctional chain building or repeating organosiloxyl group, i.e. $D=SiR^1R^2O_{2/2}$ with $R^1$ and $R^2$ independently selected from hydrogen and one to forty carbon atom monovalent hydrocarbon radicals (when $R^1$ or $R^2$ is hydrogen $D=D^H$ and when one of the R groups is alkenyl, $D^{vi}$), T is a trifunctional chain branching organofunctional unit, i.e. $T=R^7SiO_{3/2}$ where $R^7$ selected from the group consisting of hydrogen and one to forty carbon atom monovalent hydrocarbon radicals and Q is a tetrafunctional unit $SiO_{4/2}$.

Applicants have recited a broad genus of substituent groups that may be utilized in preparing compounds of the present invention. The phrase one to forty carbon atom monovalent hydrocarbon radicals includes linear alkyl, branched alkyl, linear alkenyl, branched alkenyl, linear alkynyl, branched alkynyl, halogen substituted linear alkyl, halogen substituted branched alkyl, halogen substituted linear alkenyl, halogen substituted branched alkenyl, halogen substituted linear alkynyl, halogen substituted branched alkynyl, aryl, alkylaryl, alkenylaryl, alkynylaryl, halogen substituted aryl, halogen substituted alkylaryl, halogen substituted alkenylaryl, and halogen substituted alkynylaryl. By halogen substituted, Applicants define a substituent satisfying the requirement that at least one hydrogen position of the hydrocarbon radical is replaced with or substituted by a halogen selected from the group consisting of fluorine, chlorine, bromine, or iodine. A preferred subset of one to forty carbon atom monovalent hydrocarbon radicals includes the group of monovalent radicals consisting of hydrogen, linear or branched alkyl radicals having from 1 to about 10 carbon atoms, linear or branched alkenyl radicals having from 2 to about 10 carbon atoms, linear or branched alkynyl radicals having from 2 to about 10 carbon atoms, cycloalkyl radicals having from 3 to about 12 carbon atoms, cycloalkenyl radicals having from about 3 to 12 carbon atoms, cycloalkynyl radicals having from about 8 to about 16 carbon atoms, fluorinated linear or branched alkyl radicals having from 1 to about 10 carbon atoms, chlorinated linear or branched alkyl radicals having from 1 to about 10 carbon atoms, brominated linear or branched alkyl radicals having from 1 to about 10 carbon atoms, fluorinated linear or branched alkenyl radicals having from 2 to about 10 carbon atoms, chlorinated linear or branched alkenyl radicals having from 2 to about 10 carbon atoms, brominated linear or branched alkenyl radicals having from 2 to about 10 carbon atoms, fluorinated linear or branched alkynyl radicals having from 2 to about 10 carbon atoms, chlorinated linear or branched alkynyl radicals having from 2 to about 10 carbon atoms, brominated linear or branched alkynyl radicals having from 2 to about 10 carbon atoms, hydrocarbonoxy radicals containing at least two carbon atoms, fluorinated hydrocarbonoxy radicals containing at least two carbon atoms, chlorinated hydrocarbonoxy radicals containing at least two carbon atoms, brominated hydrocarbonoxy radicals containing at least two carbon atoms aryl radicals, linear or branched alkyl aryl radicals, fluorinated aryl radicals, chlorinated aryl radicals, brominated aryl radicals; fluorinated linear or branched alkyl-, alkenyl-, or alkynyl aryl radicals; chlorinated linear or branched alkyl-, alkenyl-, or alkynyl aryl radicals; brominated linear or branched alkyl-, alkenyl-, or alkynyl aryl radicals. More preferred monovalent hydrocarbon radicals are selected from the group consisting of methyl, ethyl, propyl, trifluoropropyl, butyl, vinyl, allyl, styryl, phenyl, and benzyl. Most preferred monovalent hydrocarbon radicals are selected from the group consisting of methyl, vinyl, trifluoropropyl, and phenyl.

A copolymer is usually defined as the polymerized product of two monomers; copolymers is used in this specification in a broader sense. This broader definition of copolymers includes not only copolymers themselves, but also includes higher order mixed polymers such as terpolymers (three monomers) and higher order mixed polymers (four or more). The process of the present invention renders the synthesis of such higher order mixed polymers particularly convenient as a mixture of cyclic siloxanes may be employed in the first stage ring opening polymerization leading to a mixed polymer of order n where n is the number of cyclic species or monomers utilized in the ring opening polymerization. The second stage reaction thus increases the polymeric order to n+1 if only one species is used in the second stage and if a mixture having m members is used then the final polymer is a higher order polymer having order n+m. As used herein, a polymer of order 2 is a copolymer, a polymer of order 3 is a terpolymer, etc. Thus Applicants define polymeric order on the basis of chemically distinguishable D groups present in the resulting polymer, the number of different D groups being the polymeric order.

The term $D^n_{qn}$ refers to a set of $D_q$ having two or more members where the n is a counting index counting the different number of $D_q$. Thus the first set consists of $D^1_{q1}$ and $D^2_{q2}$. The second set consists of $D^1_{q1}$, $D^2_{q2}$, and $D^3_{q3}$. The counting index n defines both the minimum number of different D groups and the minimum polymer order of the resulting compound. When superscripts indicative of functionalization are used, i.e. an idiosyncratic superscript, in the specification, they have been used to define a functionality present in a D group, e.g. H, vi, Ph, i.e. $D^H$, $D^{vi}$, and $D^{Ph}$, and the like, which denotes a particular specie of D group. If idiosyncratic superscripts are not used, n defines absolutely the number of different D groups and the polymer order. The term $D_q$ stands for a single D unit that may be varied at will.

EXPERIMENTAL

The following non-limiting examples are intended to illustrate the invention.

EXAMPLE 1

A 500 mL round bottom flask was charged with 229.55 g, 3.10 moles, of octamethylcyclotetrasiloxane ($D_4$), 1.92 g, 0.0124 moles, decamethyl tetrasiloxane ($MD_2M$, M rich compound, M/(M+D)=0.50, molar basis), and 0.27 g of 4.3 weight percent KOH in a low molecular weight polydimethylsiloxane oil (a silanolate catalyst) having an effective base concentration of 50 ppm. The reaction was heated for 3 hours at 150° C. Having achieved equilibrium, 87–88 weight percent solids, the reaction mixture was cooled to 80°–90° C. and 1.62 g of 2 weight percent solution in a 20 centistokes (cSt) polydimethylsiloxane oil linear of a phosphonitrilic chloride having the formula ($Cl_3P(NPCl_2)_2PCl_3$) $^+PCl_6^-$ was added (effective concentration 138 ppm). The phosphonitrilic chloride neutralized the potassium silanolate catalyst leaving approximately 100 ppm of the linear phosphonitrilic chloride to act as a catalyst. The mixture was stirred for one hour at 80°–90° C. at which time 2.23 g of 1.62 weight percent hydride linear silicone hydride polymer ($MD^H_{40-50}M$) was added. The reaction was stirred for an additional 2 hours at 80°–90° C. The resulting product was clear and colorless and had a hydride content of 155 ppm with a viscosity of 2275 cSt at 25° C. Silicon-29 NMR indicated that Si—H groups were randomly placed throughout the polymer chain. The hydride polymer so produced was subsequently successfully utilized for hydrosilation without further purification or filtration.

EXAMPLE 2

The procedure of example 1 was repeated using 623 pounds of octamethylcyclotetrasiloxane, 5.2 pounds decamethyl tetrasiloxane, 0.396 pounds of 4.9 weight percent potassium hydroxide in silicone oil to yield 30 ppm effective catalyst, 3.92 pounds of a 2 weight percent phosphonitrilic chloride catalyst in 20 cSt silicone oil, and 6.22 pounds of 1.622 weight percent hydride silicone hydride polymer. The resulting product had viscosity of 2210 cSt at 25° C. and a hydride content of 160 ppm. Silicon-29 NMR indicated that Si—H groups were randomly placed throughout the polymer chain. The hydride polymer so produced was subsequently successfully utilized for hydrosilation without further purification or filtration.

EXAMPLE 3

The rapid achievement of equilibrium in the ring opening polymerization requires the presence of the base catalyst. The following attempts (Table 1) to ring open polymerize utilizing only the phosphonitrilic halide catalyst indicate that synthesis of the hydride copolymer is significantly faster using two catalysts sequentially.

TABLE 1

Preparation of Hydride Silicone Copolymers Using Only a Single Catalyst

| Reactants | Conditions | Wt. % Solids | Viscosity, cSt | % Approach to Equilibrium |
|---|---|---|---|---|
| Viscasil ™, $MD_2M$, silicone hydride polymer[1] | 80° C., 6 hrs., 60 ppm LPNC[2] | 95 | 1910 | 40 |
| $D_4$, $MD_2M$, silicone hydride polymer[1] | 80° C., 24 hrs., 100 ppm LPNC[2] | 86 | 2192 | 98 |
| $D_4$, $MD_2M$, silicone hydride polymer[1] | 80° C., 24 hrs., 50 ppm LPNC[2] | 82 | 1600 | 94 |

Notes to Table 1:
1. 1.62 weight percent hydride linear silicone hydride polymer.
2. the LPNC used had the formula $(Cl_3P(NPCl_2)_2PCl_3)^+PCl_6^-$ The results in Table 1 indicate that in contrast to achieving equilibrium in a total of approximately 5 to 10 hours (ring opening polymerization 3–6 hours, redistribution and condensation 2–6 hours), the unaided LPNC catalyst requires more than 24 hours. Thus reaction efficiency is increased by catalyzing the two reactions separately and using a first stage catalyst that can be neutralized by the second stage catalyst.

EXAMPLE 4

Preparation of $M^{vi}D^H_pD_qM^{vi}$(p=3, q=219):
$M^{vi}D^H_3D_{219}M^{vi}$, $M^{vi}=(CH_3)_2CH_2=CHSiO_{1/2}$, $D^H=(CH_3)HSiO_{2/2}$, $D=(CH_3)_2SiO_{2/2}$. A 500 mL round-bottom flask was charged with 223.63 g octamethylcyclotetrasiloxane, 2.24 g 1, 3-divinyl-1, 1, 3, 3-tetramethyl disiloxane in the presence of a silanolate catalyst, 0.27 g of 4.3 wt. % KOH in a siloxane oil (50 ppm). The reaction was stirred for 3 hours at 150° C. The resulting product was 87.3% solids, which is indicative of an equilibrium product. The reaction was cooled to between 80°–90° C. After cooling, the LPNC catalyst was added, 1.62 g of a 2 wt. % solution in a 20 cSt viscosity silicone oil (143 ppm). The reaction was stirred at the lower temperature for 1 hour before the addition of 2.46 g of a linear silicone hydride polymer having 1.62 weight percent hydride. The reaction was stirred at 80°–90° C. for an additional 2 hours. The product was a slightly hazy fluid that was filtered through a 2:1 weight mixture of Celite™ and Fuller's Earth. The filtered product was clear and colorless having a viscosity of 544 cSt at 25° C. and a hydride content of 170 ppm. Silicon-29 NMR indicated both

EXAMPLE 5

Preparation of $MD_{q1}D^{vi}_{q2}D^H_pM$ (p=10,q1=350,q2=10):

$MD_{350}D^{vi}_{10}M$: The procedure of example 4 was repeated using 175.77 g of octamethylcyclotetrasiloxane, 1.92 g of decamethyltetrasiloxane, 4.97 g of tetramethyltetravinylcyclotetrasiloxane, 0.21 g of 0.27 g of 4.3 wt. % KOH in a siloxane oil (49 ppm), 1.62 of LPNC catalyst solution (177 ppm) and 3.46 g of a linear silicone hydride polymer having 1.62 weight percent hydride. The clear and colorless product had a viscosity of 883 cSt at 25° C. and a hydride content of 288 ppm. Silicon-29 NMR indicated that both the alkenyl group and the hydride groups had been randomly incorporated into the silicone chain (chemical shifts: $D^H$=−37.5 ppm, $D^{vi}$=−35.8 ppm). This reaction is an example of using a mixture of cyclic species in the ring opening polymerization to synthesize a silicone terpolymer, three precursors (monomers) containing three different D groups, minimum polymeric order=3.

EXAMPLE 6

Preparation of $MD_{q1}D^{Ph}_{q2}D^{vi}_{q3}D^H_pM$ (p=10,q1=350,q2=10,q3=10):

$MD_{350}D^{Ph}_{10}D^{vi}_{10}M$: $D^{Ph}$ is an idiosyncratic designation for a D group having both R groups substituted by phenyl groups. The procedure employed in examples 4 and 5 was repeated using 490.0 g of octamethylcyclotetrasiloxane, 164.5 g of octaphenylcyclotetrasiloxane, 12.92 g of decamethyltetrasiloxane, 35 g of tetramethyltetravinylcyclotetrasiloxane, 0.82 g of 4.3 wt. % KOH in a siloxane oil (50 ppm), 4.92 of LPNC catalyst solution (140 ppm) and 24.4 g of a linear silicone hydride polymer having 1.62 weight percent hydride. The clear and colorless product had a viscosity of 613 cSt at 25° C. and a hydride content of 555 ppm. Silicon-29 NMR indicated that the phenyl, hydride and alkenyl groups were randomly incorporated into the silicone chain (chemical shifts: $D^{Ph}_{10}$= −48.0 ppm, $D^{Ph}_{10}D^H$=−37.5 ppm, $D^{vi}$=−35.8 ppm). This reaction is an example of using a mixture of cyclic species in the ring opening polymerization to synthesize a silicone terpolymer, at least four precursors containing four different D groups, minimum polymeric order=4.

EXAMPLE 7.

Alkenyl hydride synthesis

To a resin kettle was charged 230 grams dimethylsiloxane polymer, containing 0.022 millimoles vinyl/g of polymer having a viscosity of 78,000 cps at 25° C., and 6.58 g silicone hydride polymer, containing 0.58 millimoles hydride/g of polymer and having a viscosity of 800 cps. The mixture was heated to 90° C. while mixing. After mixing for one-half hour, 2.3 grams of LPNC solution, a 2% solution in 20 viscosity silicone oil, was added. The mixture was allowed to continue mixing at 90° C. for another 1 hour. Another 1.56 g LPNC was added and mixed at 90° C. for another 1 hour before the batch was allowed to cool to room temperature.

A sample of the resulting compound was mixed with a catalytic amount of platinum complex (11% platinum in $M^{vi}M^{vi}$) and cured at 150° C. for 5 minutes to give a strong film.

EXAMPLE 8

Alkenyl hydride synthesis

To a resin kettle was charged 1.4 g hexamethyldisiloxane, 428.08 grams of a polymer/resin mixture containing 25% $M_{0.6}D^{vi}_{0.1}Q$ and 75% dimethylsiloxane polymer, containing 0.022 millimoles vinyl/g of polymer and having a viscosity of 78,000 cps at 25° C., and 10 g silicone hydride polymer, containing 16 millimoles hydride/g of polymer and having a viscosity of 23 cps. The mixture was allowed to continue mixing at 90° C. while mixing. After mixing for one-half hour, 1.27 grams LPNC solution, as 2% LPNC in 20 viscosity silicone oil, was added. The mixture was continued mixed at 90° C. for another 2 hours before the batch was allowed to cool to room temperature. The product had a viscosity of 2000 cps at 25° C.

A sample of the resulting compound was mixed with a catalytic amount of platinum complex (11% platinum in $M^{vi}M^{vi}$) and cured at 150° C. for 5 minutes to give a strong film.

EXAMPLE 9

Alkenyl hydride synthesis

To an 8-oz bottle was charged 1.22 grams LPNC solution, as 2% LPNC in 20 viscosity silicone oil, 212.17 grams of a polymer/resin mixture containing 25% $M_{0.6}D^{vi}_{0.1}Q$ and 75% dimethylsiloxane polymer, containing 0.022 millimoles vinyl/g of polymer and having a viscosity of 78,000 cps at 25° C., and 8.38 g silicone hydride resin, $M^HQ$, containing 9.5 millimoles hydride/g of polymer. The mixture had a viscosity of 19,000 cps at 25° C. The bottle was sealed with a metal lid and placed in a 50° C. oven for 16 hours. The viscosity of the mixture dropped to 800 cps after heating.

A sample of the resulting compound was mixed with a catalytic amount of platinum complex (11% platinum in $M^{vi}M^{vi}$) and cured at 150° C. for 5 minutes to give a strong film.

EXAMPLE 10

Alkenyl hydride emulsion

To a metal beaker was charged 164.1 g of the alkenyl hydride prepared in Example 3, 3.74 g $C_{11}$–$C_{15}$ secondary alcohol ethoxylate, and 1.5 g 70% ethoxylated nonylphenol (30 moles ethylene oxide) in water. The mixture was mixed with an overhead mixer at room temperature. After the mixture was well mixed, 184.5 g of water was slowly added to the mixture while mixing. The addition took 1 hour and the mixture gradually turned to a white emulsion with viscosity of 320 cps at 25° C.

A sample of the resulting emulsion was mixed with a catalytic amount of a platinum emulsion (containing 0.16% platinum, 1.25% $M^{vi}M^{vi}$, 39% vinyl terminated polydimethylsiloxane that has a viscosity of 20 cps, 2.2% polyvinyl alcohol, 2% propylene glycol, and 55.6% water) and cure at 150° C. for 5 minutes to give a strong film.

EXAMPLE 11

Alkenyl hydride synthesis

A 500 mL round-bottomed flask was charged with 75 grams cyclo-octamethyltetrasiloxane ([$D_4$], 1.01 moles D), 25 grams cyclo-1,2,3,4-tetravinyl-1,2,3,4-tetramethyltetrasiloxane ([$D^{vi}_4$],), 27 grams decamethyl tetrasiloxane (0.175 moles D, 0.17 moles M), and 0.18 grams of 4.3% KOH silanolate catalyst (60 ppm). The reaction was stirred for 3 hrs at 150° C. Reaction completion was tested by doing a solids test, noting that equilibrium is reached when the percent solids reaches a plateau (in this case solids level plateaued at 80% solids). The reaction was cooled to 80°–90° C. When cooled to the lower temperature, 2.5 grams of a 2% solution in 20 viscosity silicone oil of LPNC was added (138 ppm LPNC catalyst). The reaction was stirred at temperature for 1 hour at which point hydride 173 grams containing 16 millimoles/g of silicone hydride polymer was added. The reaction mixture was stirred at 80°–90° C. for an additional 2 hours. The clear product had a low viscosity and 0.90% hydride. Silicon-29 NMR indicated the Si—H group was randomly reacted into the polymer backbone.

EXAMPLE 12
Alkenyl hydride emulsion
Premix

To a metal reactor was charged 6832.5 g of a polymer/resin mixture containing 25% $M_{0.6}D^{Vi}_{0.1}Q$ and 75% dimethylsiloxane polymer, containing 0.022 millimoles vinyl/g of polymer and having a viscosity of 78,000 cps at 25° C., 142.7 g $C_{11}$–$C_{15}$ secondary alcohol ethoxylate, and 266.2 g 70% ethoxylated nonylphenol (30 moles ethylene oxide) in water. The mixture was heated to 80° C. while mixing. After the mixture was well mixed, 1161.6 g of water was slowly added to the mixture. The mixture was continued mixing and the batch was allowed to cool to 46° C. Viscosity measured at this temperature was 82,000 cps. The mixture was then milled with a colloid mill. The heat generated by the mechanical shear heated the mixture to 71° C.

Thickener Solution

To a separate container was charged 10,560 g of water, 135 g of a biocide (Phenonip from Nipa laboratories, Inc., Wilmington, Del.), 117 g of an antifoam emulsion (AF9010 available from GE Silicones, Waterford, N.Y.), and 120 g of carboxy methyl cellulose (CMC). The mixture was mixed at room temperature until the carboxy methyl cellulose was completely dissolved.

Emulsion

The emulsion was prepared by mixing the milled premix into the thickener solution at room temperature to result in a white emulsion with a viscosity of 3,800 cps at 25° C.

Coating Formulation 100 parts of the Example 12 vinyl emulsion was mixed with 0.35 part of an inhibitor, (+/−) 3,5 dimethyl-1-hexyn-3-ol, 4 parts of Example 11, 5.6 parts of a 50% aqueous dispersion of colloidal silica with an average particle size of 20 microns, and 1.75 parts of γ-glycydoxypropyltrimethoxysilane. After the dispersion was well mixed, a platinum emulsion that contains 0.16% platinum, 1.25% $M^{Vi}M^{Vi}$, 39% vinyl terminated polydimethylsiloxane having a viscosity of 20 cps, 2.2% polyvinyl alcohol, 2% propylene glycol, and 55.6% water was added and the material was coated on a nylon cloth with a spatula. Curing was implemented by heating the coated cloth in an 180° C. oven for 3 minutes to result in a tight and strong coating on the cloth.

We claim:

1. A curable silicone composition comprising:
   a) a silicone hydride copolymer having the formula:

$$M_wD_qT_rQ_s,$$

having at least two $D_q$ where each $D_q$ is different from every other $D_q$ and each $D_q$ has the formula:

$$D_q=SiR^1R^2O_{2/2}$$

where each $R^1$ and $R^2$ in each $D_q$ is independently selected from the group consisting of hydrogen and one to forty carbon atom monovalent hydrocarbon radicals where each subscript q of $D_q$ is independently one or greater with $$M=R^4R^5R^6SiO_{1/2}$$

where $R^4$, $R^5$ and $R^6$ are each independently selected from the group consisting of hydrogen and one to forty carbon atom monovalent hydrocarbon radicals where the stoichiometric subscript u of M is non-zero and positive;

$$T=R^7SiO_{3/2}$$

where $R^7$ is selected from the group consisting of hydrogen and one to forty carbon atom monovalent hydrocarbon radicals with the stoichiometric subscript r of T zero or positive; and $$Q=SiO_{4/2}$$

with the stoichiometric subscript s of Q is zero or positive; subject to the limitation that one of $R^1$, $R^2$, $R^4$, $R^5$, $R^6$, and $R^7$ is hydrogen and that one of $R^1$, $R^2$, $R^4$, $R^5$, $R^6$, and $R^7$ which is not hydrogen is an alkenyl group having from two to forty carbon atoms wherein said silicone hydride copolymer comprises a $D_q$ where $R^1$ or $R^2$ is hydrogen, a $D_q$ where $R^1$ or $R^2$ is an alkenyl group having from two to forty carbon atoms and either M where $R^4$, $R^5$ or $R^6$ is hydrogen or M where $R^4$, $R^5$ or $R^6$ is an alkenyl group having from two to forty carbon atoms; and b) a hydrosilylation catalyst, a free radical initiator or both.

2. The composition of claim 1 wherein said catalyst is a hydrosilylation catalyst.

3. The composition of claim 2 wherein the subscript r is zero.

4. The composition of claim 3 wherein the subscript s is zero.

5. The composition of claim 4 wherein $R^1$, $R^2$, $R^4$, $R^5$, and $R^6$ which are not hydrogen or an alkenyl having from two to forty carbon atoms are methyl or phenyl.

6. The composition of claim 5 wherein $R^1$, $R^2$, $R^4$, $R^5$, and $R^6$ which are not hydrogen or an alkenyl having from two to forty carbon atoms are methyl.

7. The composition of claim 6 wherein $R^1$, $R^2$, $R^4$, $R^5$, and $R^6$ which are not hydrogen or an alkenyl having from two to forty carbon atoms are phenyl.

8. The cured composition of claim 5.

9. A curable emulsion comprising:
   a) a silicone hydride copolymer having the formula:

$$M_wD_qT_rQ_s,$$

having at least two $D_q$ where each $D_q$ is different from every other $D_q$ and each $D_q$ has the formula:

$$D_q=SiR^1R^2O_{2/2}$$

where each $R^1$ and $R^2$ in each $D_q$ is independently selected from the group consisting of hydrogen and one to forty carbon atom monovalent hydrocarbon radicals where each subscript q of $D_q$ is independently one or greater with $$M=R^4R^5R^6SiO_{1/2}$$

where $R^4$, $R^5$ and $R^6$ are each independently selected from the group consisting of hydrogen and one to forty carbon atom monovalent hydrocarbon radicals where the stoichiometric subscript u of M is non-zero and positive;

$$T=R^7SiO_{3/2}$$

where $R^7$ is selected from the group consisting of hydrogen and one to forty carbon atom monovalent hydrocarbon radicals with the stoichiometric subscript r of T zero or positive; and $$Q=SiO_{4/2}$$

with the stoichiometric subscript s of Q is zero or positive; subject to the limitation that one of $R^1$, $R^2$, $R^4$, $R^5$, $R^6$, and $R^7$ is hydrogen and that one of $R^1$, $R^2$, $R^4$, $R^5$, $R^6$, and $R^7$ which is not hydrogen is an alkenyl group having from two to forty carbon atoms wherein said silicone hydride copolymer comprises a $D_q$ where $R^1$ or $R^2$ is hydrogen, a $D_q$ where $R^1$ or $R^2$ is an alkenyl group having from two to forty carbon atoms and either M where $R^4$, $R^5$ or $R^6$ is hydrogen or M where $R^4$, $R^5$ or $R^6$ is an alkenyl group having from two to forty carbon atoms;

b) a hydrosilylation catalyst, a free radical initiator or both;

c) an emulsifying agent; and d) water.

10. The composition of claim 9 wherein said catalyst is a hydrosilylation catalyst.

11. The composition of claim 10 wherein the subscript r is zero.

12. The composition of claim 11 wherein the subscript s is zero.

13. The composition of claim 12 wherein $R^1$, $R^2$, $R^4$, $R^5$, and $R^6$ which are not hydrogen or an alkenyl having from two to forty carbon atoms are methyl or phenyl.

14. The composition of claim 13 wherein $R^1$, $R^2$, $R^4$, $R^5$, and $R^6$ which are not hydrogen or an alkenyl having from two to forty carbon atoms are methyl.

15. The composition of claim 14 wherein $R^1$, $R^2$, $R^4$, $R^5$, and $R^6$ which are not hydrogen or an alkenyl having from two to forty carbon atoms are phenyl.

16. The cured composition of claim 13.

17. An article of manufacture comprising the curable composition of claim 1.

18. An article of manufacture comprising the cured composition of claim 1.

19. An article of manufacture comprising the curable composition of claim 9.

20. An article of manufacture comprising the cured composition of claim 9.

21. The article of claim 18 wherein said article is a laminate.

22. The article of claim 20 wherein said article is a laminate.

23. A curable emulsion comprising:

a) a silicone hydride copolymer having the formula:

$$M_wD_qT_rQ_s$$

having at least two $D_q$ where each $D_q$ is different from every other $D_q$ and each $D_q$ has the formula:

$$D_q = SiR^1R^2O_{2/2}$$

where each $R^1$ and $R^2$ in each $D_q$ is independently selected from the group consisting of hydrogen and one to forty carbon atom monovalent hydrocarbon radicals where each subscript q of $D_q$ is independently one or greater with $$M = R^4R^5R^6SiO_{1/2}$$

where $R^4$, $R^5$ and $R^6$ are each independently selected from the group consisting of hydrogen and one to forty carbon atom monovalent hydrocarbon radicals where the stoichiometric subscript u of M is non-zero and positive;

$$T = R^7SiO_{3/2}$$

where $R^7$ is selected from the group consisting of hydrogen and one to forty carbon atom monovalent hydrocarbon radicals with the stoichiometric subscript r of T zero or positive; and $$Q = SiO_{4/2}$$

with the stoichiometric subscript s of Q is zero or positive; subject to the limitation that one of $R^1$, $R^2$, $R^4$, $R^5$, $R^6$, and $R^7$ is hydrogen and that one of $R^1$, $R^2$, $R^4$, $R^5$, $R^6$, and $R^7$ which is not hydrogen is an alkenyl group having from two to forty carbon atoms wherein said silicone hydride copolymer comprises an alkenyl group;

b) a catalyst;

c) an emulsifying agent; and d) water.

24. The composition of claim 23 wherein said catalyst is a hydrosilylation catalyst.

25. The composition of claim 24 wherein the subscript r is zero.

26. The composition of claim 25 wherein the subscript s is zero.

27. The composition of claim 26 wherein $R^1$, $R^2$, $R^4$, $R^5$, and $R^6$ are methyl or phenyl.

28. The composition of claim 27 wherein $R^1$, $R^2$, $R^4$, $R^5$, and $R^6$ are methyl.

29. The composition of claim 26 wherein $R^1$, $R^2$, $R^4$, $R^5$, and $R^6$ are phenyl.

30. The cured composition of claim 27.

31. An article of manufacture comprising the curable composition of claim 23.

32. An article of manufacture comprising the cured composition of claim 23.

33. The article of claim 32 wherein said article is a laminate.

* * * * *